(12) United States Patent
Kelly et al.

(10) Patent No.: US 12,346,746 B2
(45) Date of Patent: *Jul. 1, 2025

(54) METHOD AND SYSTEM FOR A COMMON-ATTRIBUTE VIRTUAL DESKTOP INFRASTRUCTURE (VDI) ENVIRONMENT WITH TIERED DATA PROCESSING UNIT (DPU) CAPABILITIES

(71) Applicant: Dell Products L.P., Round Rock, TX (US)

(72) Inventors: John Kelly, Mallow (IE); Dharmesh M. Patel, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 496 days.

This patent is subject to a terminal disclaimer.

(21) Appl. No.: 17/723,003

(22) Filed: Apr. 18, 2022

(65) Prior Publication Data

US 2023/0333909 A1 Oct. 19, 2023

(51) Int. Cl.
G06F 9/04 (2006.01)
G06F 9/451 (2018.01)
G06F 9/50 (2006.01)

(52) U.S. Cl.
CPC ............ G06F 9/5077 (2013.01); G06F 9/452 (2018.02); G06F 9/5044 (2013.01)

(58) Field of Classification Search
CPC ...... G06F 9/5077; G06F 9/452; G06F 9/5044; G06F 9/5088; G06F 2209/5011; G06F 9/44505

See application file for complete search history.

(56) References Cited

U.S. PATENT DOCUMENTS

| | | | |
|---|---|---|---|
| 9,569,276 B2 | 2/2017 | Kelly | |
| 9,785,478 B1 | 10/2017 | Babu B R | |
| 9,893,953 B1 * | 2/2018 | Castelli | ................. G06F 3/0605 |
| 10,318,321 B2 | 6/2019 | Chen | |
| 10,581,995 B1 * | 3/2020 | Kudrin | ................ H04L 67/1095 |
| 10,599,457 B2 | 3/2020 | Simoncelli | |
| 10,805,384 B1 | 10/2020 | Kutuzov | |
| 11,347,558 B2 | 5/2022 | Crossley | |
| 11,392,403 B2 | 7/2022 | Rangayya | |
| 11,855,847 B2 | 12/2023 | Kelly | |

(Continued)

*Primary Examiner* — Kevin L Young
*Assistant Examiner* — Abdou K Seye
(74) *Attorney, Agent, or Firm* — CHamberlain Hrdlicka; Aly Z. Dossa

(57) ABSTRACT

A method for managing a virtual desktop infrastructure (VDI) environment includes: obtaining a plurality of target resource specific pool specific configuration templates for a target resource, in which each of the plurality of target resource specific pool specific configuration templates is associated with one or a plurality of virtual desktop (VD) pools, in which the target resource is a data processing unit (DPU); obtaining a common configuration template set; generating a VD pool configuration for each of the plurality of VD pools using the plurality of target resource specific pool specific configuration templates and the common configuration template set to obtain a plurality of VD pool configurations; selecting a default VD pool from the plurality of VD pools; and deploying, based on the selection, a plurality of VDs into the default VD pool using a VD pool configuration associated with the default VD pool.

19 Claims, 9 Drawing Sheets

(56) References Cited

U.S. PATENT DOCUMENTS

| | | |
|---|---|---|
| 2010/0070978 A1 | 3/2010 | Chawla et al. |
| 2011/0246984 A1 | 10/2011 | Sharp et al. |
| 2013/0332610 A1 | 12/2013 | Beveridge |
| 2016/0041837 A1 | 2/2016 | Rangayya et al. |
| 2016/0274948 A1* | 9/2016 | Kelly .................... G06F 9/5077 |
| 2016/0342441 A1* | 11/2016 | Beveridge ............... G06F 9/452 |
| 2017/0046206 A1 | 2/2017 | Kofkin-Hansen et al. |
| 2018/0067782 A1 | 3/2018 | Kofkin-Hansen et al. |
| 2018/0130171 A1 | 5/2018 | Prakash |
| 2018/0150312 A1 | 5/2018 | Gupta et al. |
| 2019/0087204 A1* | 3/2019 | Babol .................... G06F 9/5027 |
| 2019/0327144 A1 | 10/2019 | Tembey |
| 2020/0050474 A1 | 2/2020 | Rangayya et al. |
| 2020/0133718 A1 | 4/2020 | Koehler et al. |
| 2022/0083355 A1 | 3/2022 | Kelly |
| 2022/0156124 A1 | 5/2022 | Nandavanam et al. |
| 2023/0266979 A1 | 8/2023 | Madishetti |

* cited by examiner

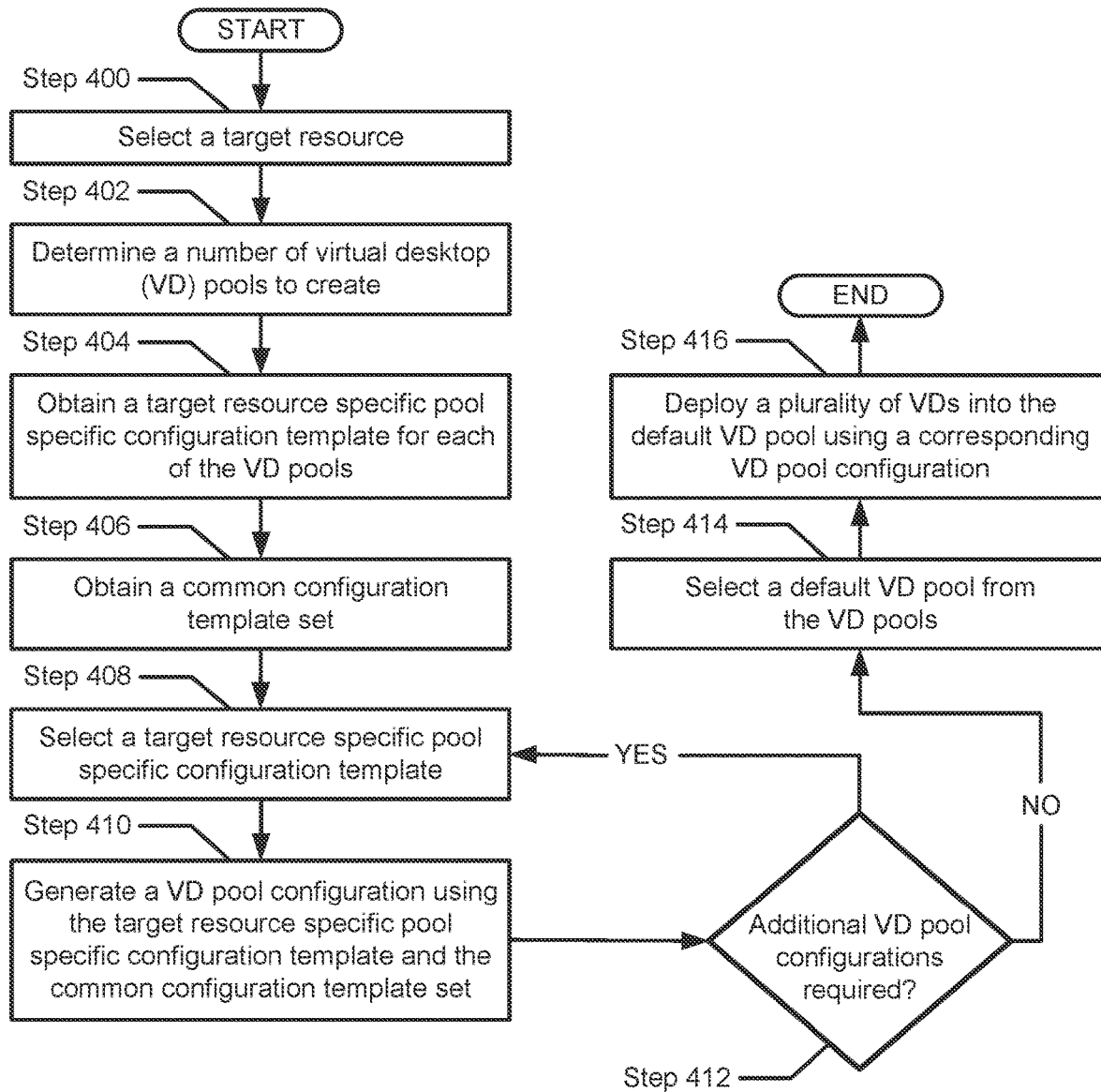
FIG. 4.1

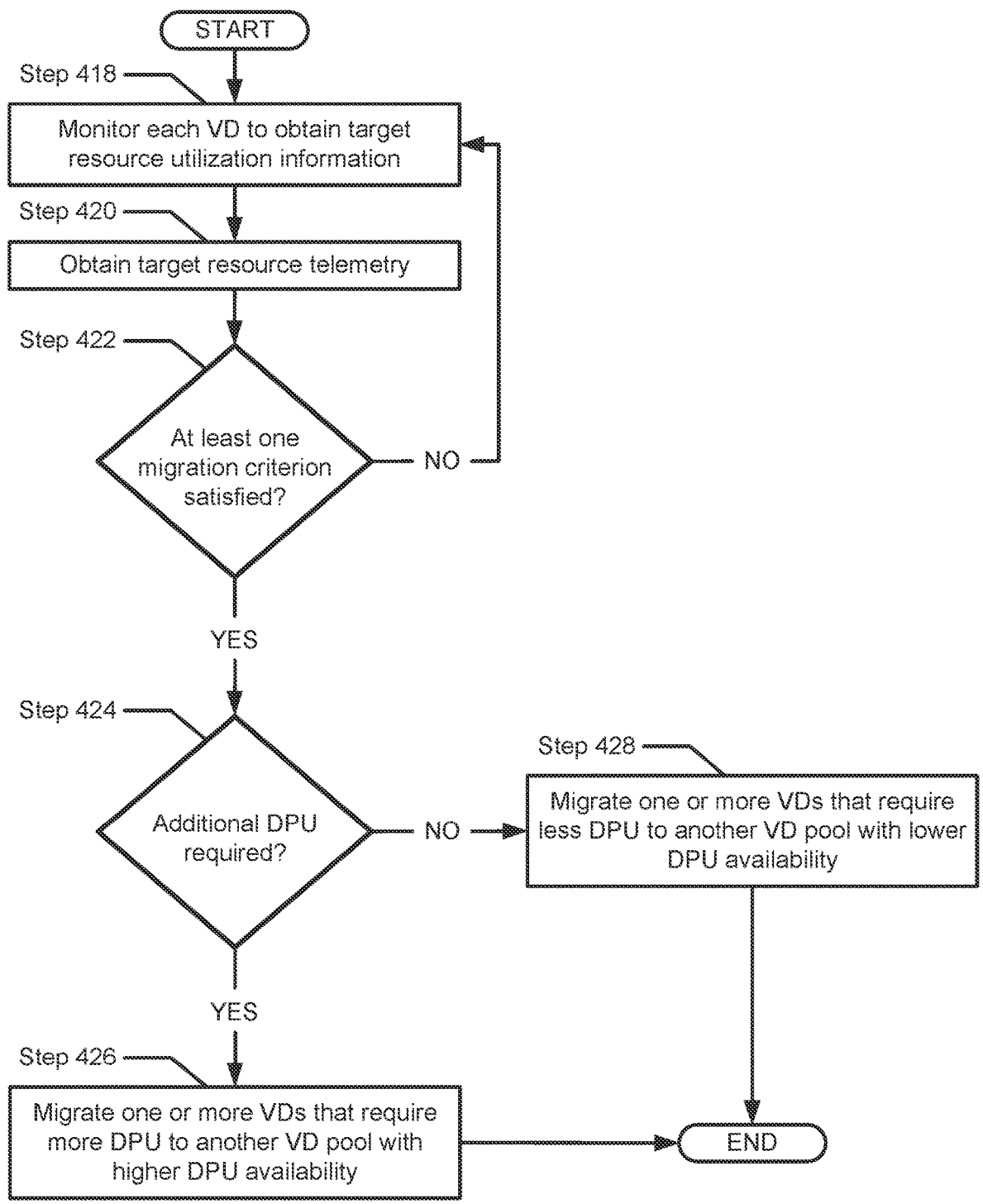
FIG. 4.2

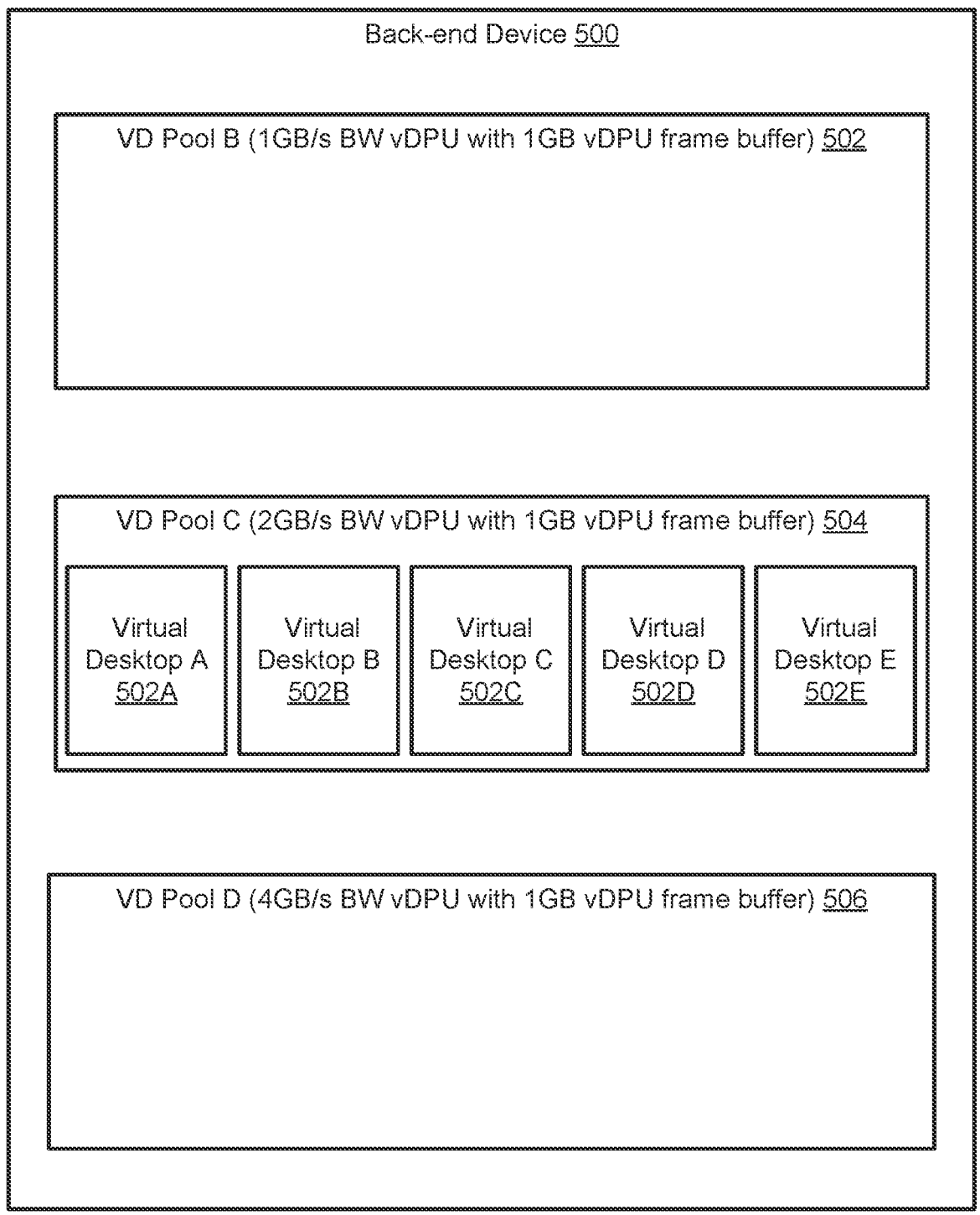
FIG. 5.1

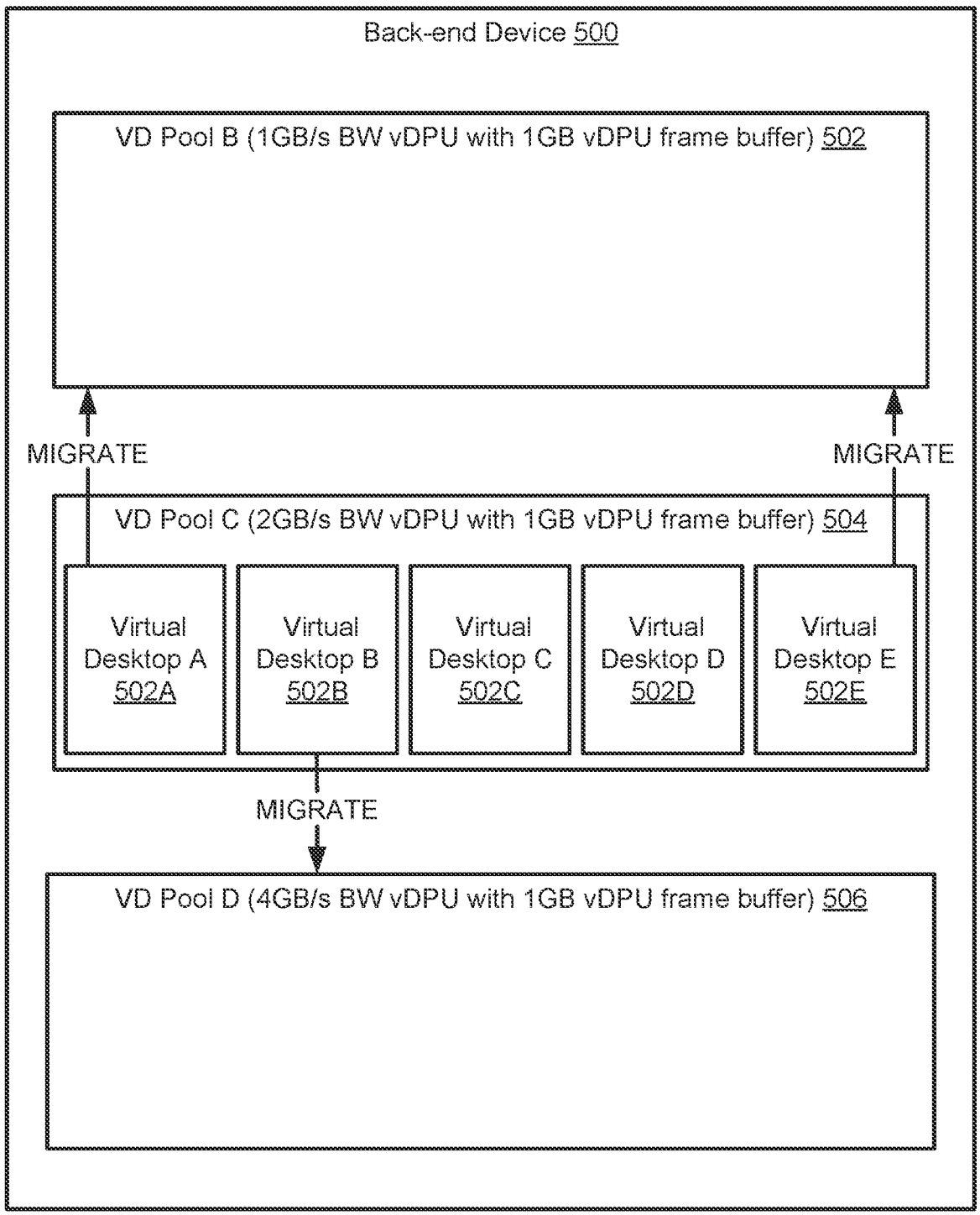
FIG. 5.2

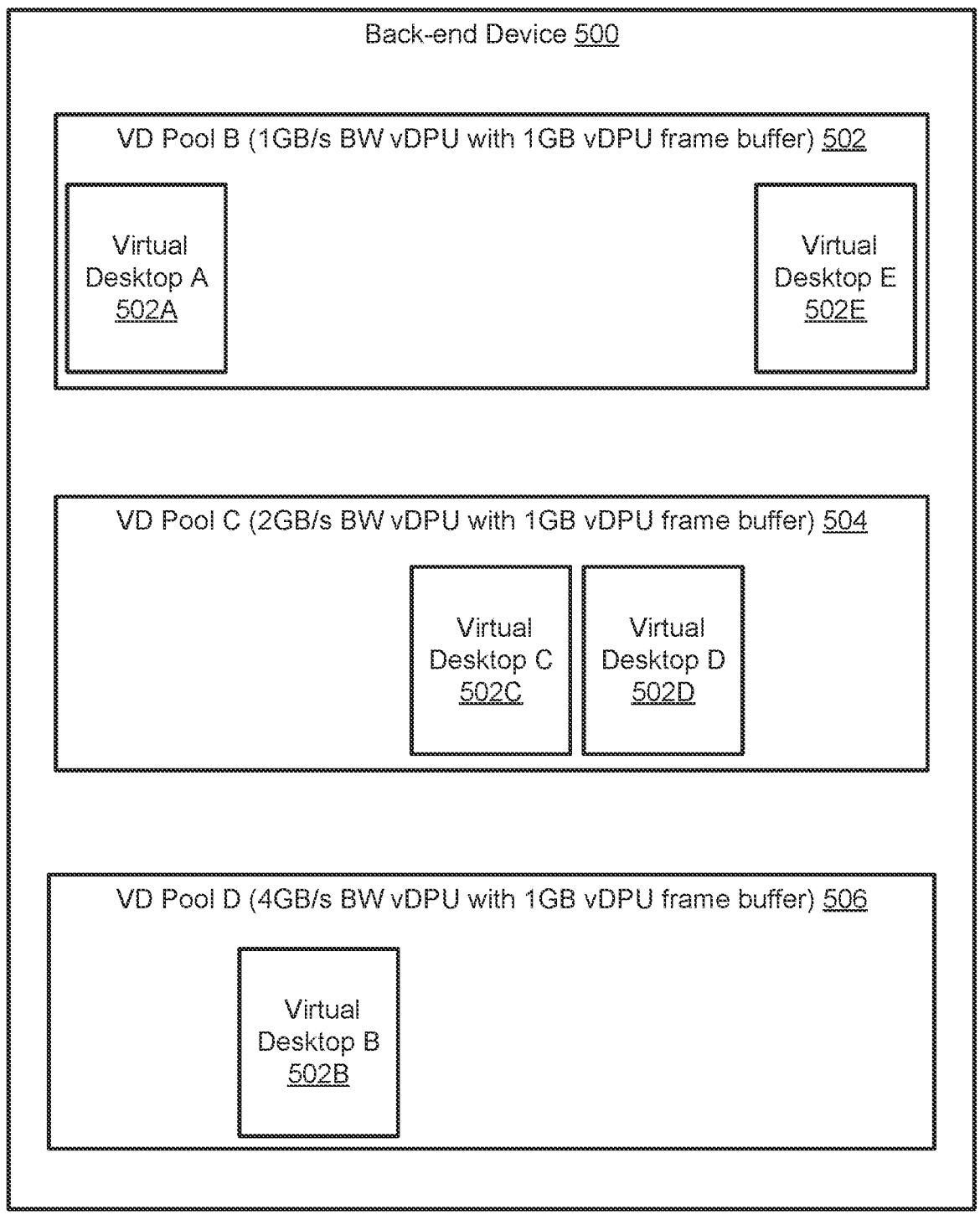
FIG. 5.3

METHOD AND SYSTEM FOR A COMMON-ATTRIBUTE VIRTUAL DESKTOP INFRASTRUCTURE (VDI) ENVIRONMENT WITH TIERED DATA PROCESSING UNIT (DPU) CAPABILITIES

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 4.1 and 4.2 show a method for managing a common-attribute virtual desktop infrastructure (VDI) environment with tiered data processing unit (DPU) capabilities in accordance with one or more embodiments of the invention.

FIGS. 5.1-5.3 show an example back-end device in accordance with one or more embodiments of the invention.

DETAILED DESCRIPTION

Figure 1:
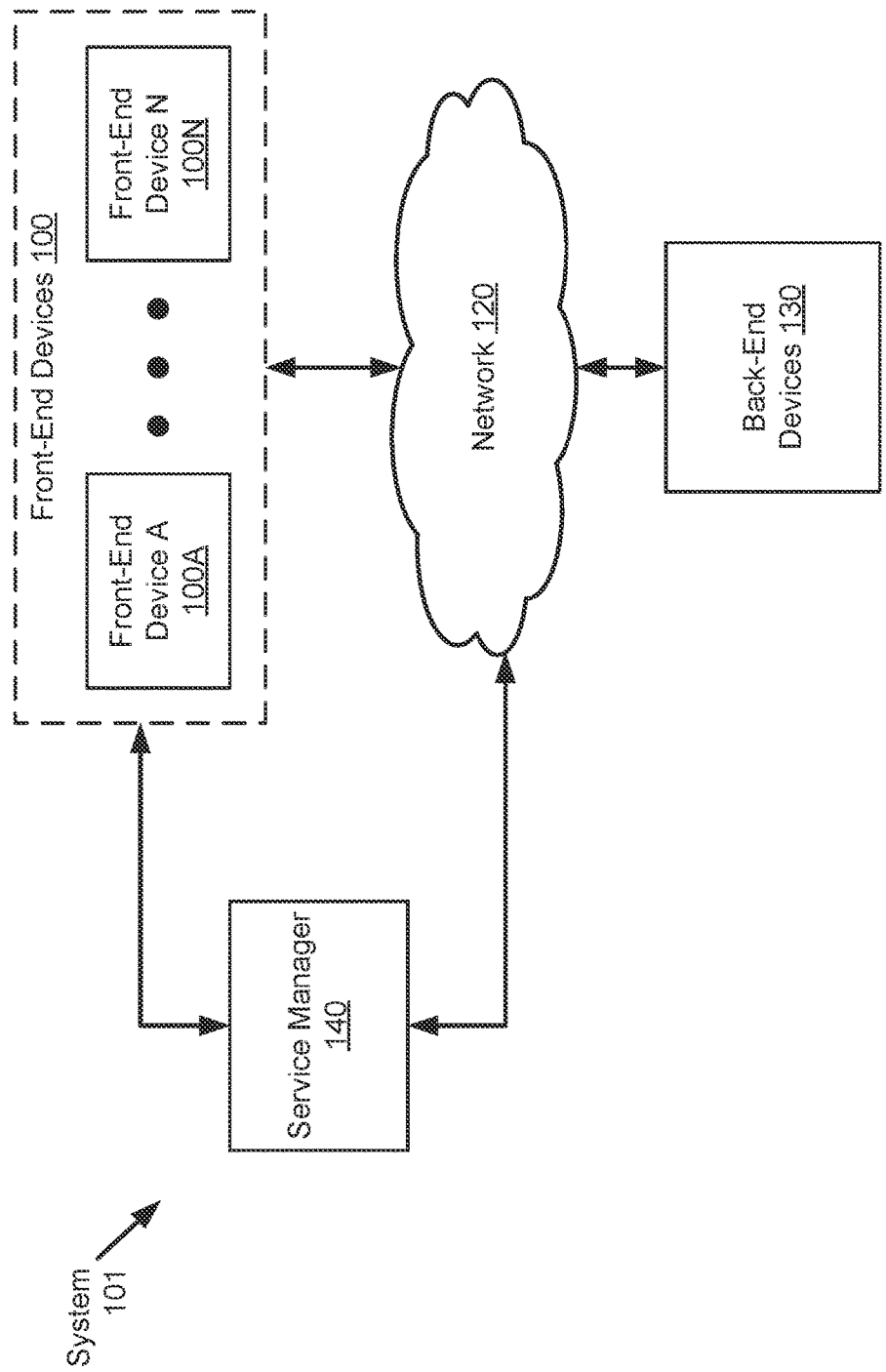
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, computing resources of pooled virtual desktops (VDs) share the same (e.g., fixed) configuration parameters (e.g., common-attributes) in a virtual desktop infrastructure (VDI) environment. These environments can be referred to as common-attribute VDI environments. Usually this sharing of common-attributes may limit the computing resources' production workloads (e.g., reading data from a target table, writing data from the target table, etc.) of the pooled VDs. Embodiments of the invention relate to methods and systems for managing a common-attribute VDI environment with tiered DPU capabilities. More specifically, various embodiments of the invention may obtain a plurality of target resource specific pool specific configuration templates (also referred herein simply as "a target L2 template") and a common configuration template set. A VD pool configuration may then be generated for each of a plurality of VD pools using the obtained plurality of target resource specific pool specific configuration templates and the obtained common configuration template. A default VD pool from the plurality of VD pools may then be selected. Based on the selection, a plurality of VDs may be deployed into the default VD pool using a VD pool configuration associated with the default VD pool. Each of the plurality of VDs in the default VD pool may then be monitored to obtain target resource utilization information (e.g., DPU utilization information). Based on the obtained target resource utilization information, at least one migration criterion of the default VD pool may be satisfied. Based on the satisfied migration criterion, if one or more VDs require an additional target resource availability, the one or more VDs may be migrated to another VD pool of the plurality of VD pools with a higher target resource availability. This advantageously provides a reconfigurable common-attribute VDI environment that is able to dynamically adapt to users' requirements (e.g., requirement of more or less DPU availability for executing processes) and/or technical considerations (e.g., security, performance, and storage policies considerations) of a data center.

In the context of one or more embodiments disclosed herein, the term "storage" refers specifically to persistent storage (e.g., non-volatile storage such as, but is not limited to: disk drives, solid-state drives (SSDs), etc.) while the term "memory" refers specifically to non-persistent memory (e.g., volatile memory such as, but is not limited to: random access memory (RAM)).

The following describes various embodiments of the invention.

FIG. 1 shows a diagram of a system (101) in accordance with one or more embodiments of the invention. The system (101) includes front-end devices (100), a network (120), back-end devices (130), and a service manager (140). The system (101) may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the system (101) may provide computer-implemented services (e.g., real-time network monitoring, backup and disaster recovery, server virtualization, etc.) to users. To provide the computer-implemented services to the users, the system (101) may perform computations locally (e.g., at the users' site using the front-end devices (100)) and remotely (e.g., away from the users' site using back-end devices (130)). By doing so, the users may utilize different computing devices (e.g., 600, FIG. 6) that have different quantities of computing resources (e.g., processing cycles, memory, storage, etc.) while still being afforded a consistent user experience. For example, by performing computations remotely, the system (101) may maintain the user experience provided by the different computing devices even when the different computing devices possess different quantities of computing resources.

In one or more embodiments of the invention, to provide the aforementioned computer-implemented services, the system (101) may include any number of front-end devices (front-end device A (100A), front-end device N (100N)). In one or more embodiments, the front-end devices (100) may be utilized by the users and/or administrators (e.g., a user with permission to make changes on a computing system that will affect other users of that computing system). However, not all of the users and/or administrators may be allowed to receive all of the aforementioned computer-implemented services.

In one or more embodiments of the invention, different front-end devices (100A, 100N) may have different computational capabilities. For example, the front-end device A (100A) may have 16 GB dynamic random-access-memory (DRAM) and 1 central processing unit (CPU) with 12 cores, whereas the front-end device N (100N) may have 8 GB persistent memory (PMEM) and 1 CPU with 16 cores. Other different computational capabilities of the front-end devices (100) not listed above may also be taken into account without departing from the scope of the invention.

In one or more embodiments of the invention, to provide a consistent user experience, the front-end devices (100) may use a virtual desktop infrastructure (VDI) environment or other types of computing environments that enable remote resources (e.g., back-end devices (130)) to provide computer-implemented services. In one or more embodiments, the computer-implemented services provided by the back-end devices (130) may appear (to the users) to be provided by the front-end devices (100). In this manner, for example, the front-end devices (100) may be capable of: (i) collecting users' input; (ii) correlating the collected users' inputs to functionalities of the computer-implemented services to be provided to the users; (iii) communicating with the back-end devices (130) that perform the computations necessary to provide the functionalities of the computer-implemented services; and (iv) using the computations performed by the back-end devices (130) to provide the computer-implemented services in a manner that appears to be performed locally to the users.

Figure 6:
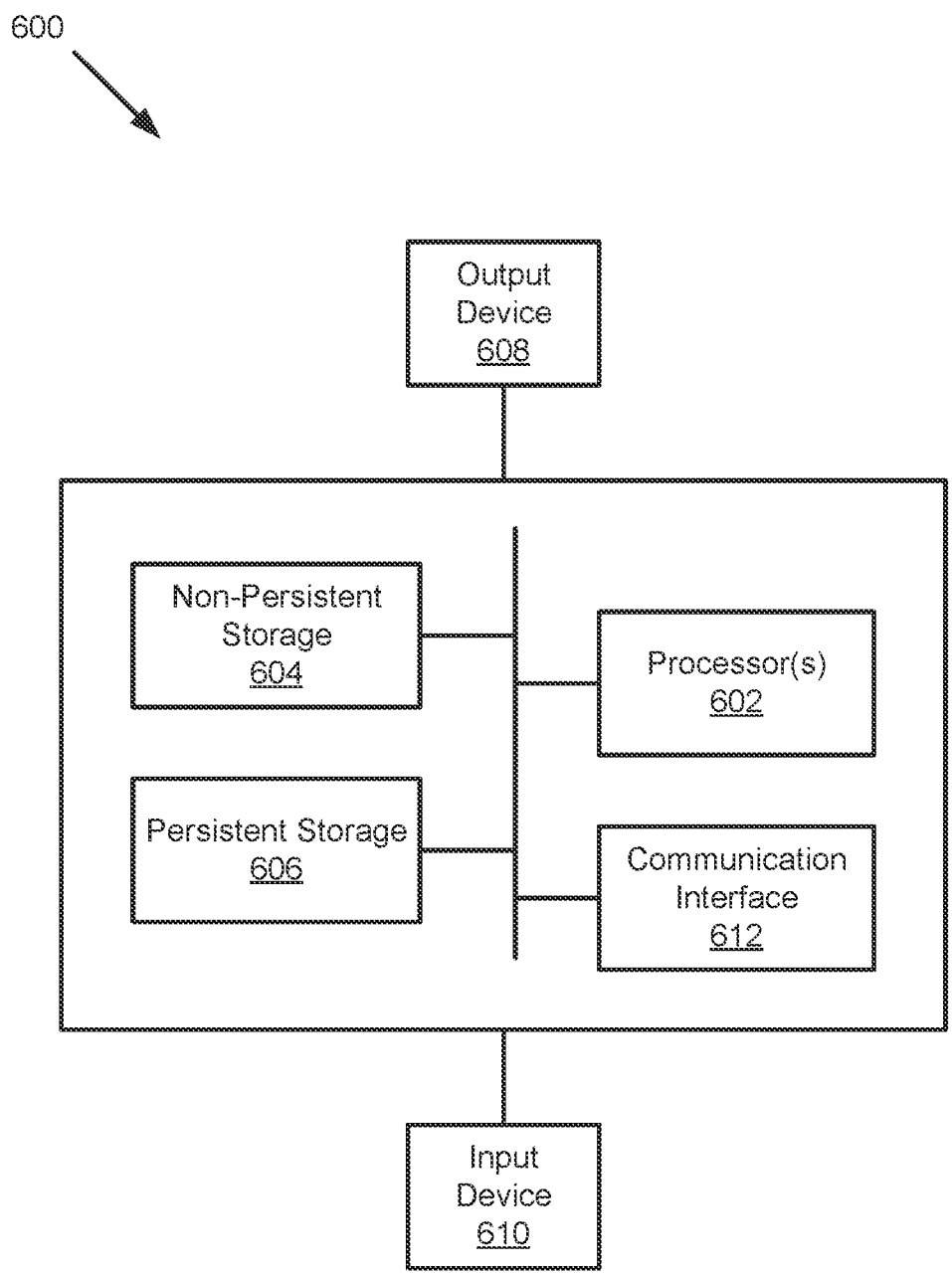
FIG. 6 shows a diagram of a computing device in accordance with one or more embodiments of the invention.

In one or more embodiments of the invention, the front-end devices (100) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the front-end devices (100) described throughout this application.

Alternatively, in one or more embodiments of the invention, the front-end devices (100) may be implemented as logical devices. A logical device may utilize the computing resources of any number of computing devices to provide the functionality of the front-end devices (100) described throughout this application.

In one or more embodiments of the invention, the above-mentioned system (101) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (101) components.

In one or more embodiments of the invention, the network-enabled subcomponents may be capable of: (i) performing one or more communication schemes (e.g., Internet protocol communications, Ethernet communications, etc.); (ii) being configured by the computing devices in the network (120); and (iii) limiting communication(s) on a granular level (e.g., on a per-port level, on a per-sending device level, etc.).

In one or more embodiments of the invention, while communicating with the back-end devices (130) remotely over the network (120), the front-end devices (100) may receive, generate, process, store, and/or transmit data structures (e.g., lists, tables, etc.). In one or more embodiments, the data structures may have a predetermined format in accordance with a communication protocol (e.g., a transmission control protocol (TCP), a user datagram protocol (UDP), etc.) implemented by the front-end devices (100), the network-enabled subcomponents, the network (120), and/or the back-end devices (130).

In one or more embodiments of the invention, while providing different types of computer-implemented services, the front-end devices (100) may communicate with the back-end devices (130) using different ports (e.g., file transfer protocol (FTP) port 20, network time protocol (NTP) port 123, etc.). In this manner, different functionalities of the computer-implemented services provided by the front-end devices (100) may be dependent on being able to communicate with the back-end devices (130) via different ports. If such communications are made inoperable, the front-end devices (100) may then be prevented from providing functionalities of the computer-implemented services corresponding to the respective ports.

In one or more embodiments of the invention, the back-end devices (130) may provide remote computer-implemented services to the front-end devices (100). In one or more embodiments, the front-end devices (100) may access the remote computer-implemented services via the VDI environment hosted by the back-end devices (130).

In one or more embodiments of the invention, the VDI environment is a desktop virtualization technology that runs one or more desktop operation systems (OSs) (e.g., an environment through which a user controls a computing device (e.g., 600, FIG. 6)) in a data center. In one or more embodiments, the users of the front-end devices (100) may access an image of the desktop OS (e.g., a virtual desktop (VD) image) remotely over the network (120). In this manner, the users may interact with the desktop OS (including its applications) as if it was running locally in the front-end devices (100).

In one or more embodiments of the invention, the VD image may refer to a preconfigured image of the desktop OS in which the desktop environment is separated from the computing device (e.g., 600, FIG. 6) used to access it. In one or more embodiments, the accessibility of the users to the VD image (also referred to herein simply as "VD") may depend on a configuration set by the administrators.

In one or more embodiments of the invention, for example, the users may be automatically directed to a login screen of the VD when they are connected to the VDI environment over the network (120). In this scenario, the VD may only be allocated to a specific user (via a VD identifier (not shown)). As another example, the users may need to select a VD from a plurality of VDs (e.g., a VD pool) to launch when they are connected to the VDI environment over the network (120). In this scenario, the users may have access to all of the VDs in the VD pool.

In one or more embodiments of the invention, once the login screen of a VD is displayed, a user accessing the VD may enter the user's credentials (e.g., username, password, etc.) on the login screen. The login screen may be a graphical user interface (GUI) generated by a visualization module (not shown) of the back-end devices (130). In one or more embodiments, the visualization module may be implemented in hardware (i.e., circuitry), software, or any combination thereof.

In one or more embodiments of the invention, once the user has logged into the VD, the user may select one or more applications (e.g., computer programs) and/or may start performing one or more operations (e.g., functions, tasks, activities, etc.) available on the VD. Examples of the applications may include, but are not limited to: a word processor, a media player, a web browser, a file viewer, an image editor, etc.

In one or more embodiments of the invention, the applications installed on the VDs may include functionality to request and use each VD's computing resources (e.g., memory, CPU, storage, network bandwidth (BW), graphics processing unit (GPU), DPU, etc.). Additional details regarding the computing resources of the VDs utilized by the applications are described below in reference to FIG. 2.

In one or more embodiments of the invention, to be able to provide the computer-implemented services of the VDI environment to the users, the back-end devices (130) may need to install a corresponding front-end device application (e.g., Remote Desktop Protocol (RDP) application, Enlighted Data Transport (EDT) application, etc.) or may need to run a hypertext markup language (e.g., HTML version 5) based session to initiate a remote display protocol. The remote display protocol may include, but it is not limited to: Independent Computing Architecture (ICA), EDT, Blast, Personal Computer over Internet Protocol (PCoIP), RDP, etc.

In one or more embodiments of the invention, the remote display protocol may control the front-end devices' (100) multimedia capabilities (e.g., display, audio, video, etc.) via a multimedia engine (not shown). For example, the multimedia engine may control a display of a front-end device (100A, 100N) such that a status of an application running on the VD may be displayed in real-time to a user of the front-end device (100A, 100N). The status may be displayed in any visual format that would allow the user to easily comprehend (e.g., read and parse) the listed information.

In one or more embodiments of the invention, the multimedia engine is operatively connected to the front-end device (100A, 100N). The multimedia engine may be implemented using hardware, software, or any combination thereof.

In one or more embodiments of the invention, the remote display protocol discussed above may compress data that is transmitted to and from the front-end device (100A, 100N) for a better user experience (e.g., reduced latency). For example, the user of the front-end device (100A, 100N) may operate on a spreadsheet (e.g., an application where data may be analyzed and stored in tabular form). In this scenario, the front-end device (100A, 100N) may transmit user input (e.g., mouse movements, keystrokes, etc.) to the VD and bitmaps (e.g., a format to store computing device-independent and application-independent images) may be transmitted in response back to the front-end device (100A, 100N). More specifically, the data itself may not be populated to the user display; instead, the user display may show bitmaps that represent the data. When the user enters additional data into the spreadsheet, the front-end device (100A, 100N) may only transmit the updated bitmaps.

In one or more embodiments of the invention, to perform the example discussed above, the remote display protocol may use a robust header compression (ROHC) method to compress a header of a communication protocol. For example, the ROHC method may compress 40 bytes of IP version 4 (IPv4) header into 1 byte. In one or more embodiments, the header of the communication protocol may include, but it is not limited to: a sequence number of a data packet (e.g., a small amount of data transmitted over the network (120)), information related to destination IP, a plurality of pointers to verify the status of the transmitted data packet, etc.

Additionally, to perform the example discussed above, the remote display protocol may use a RDP data compression algorithm to compress the data itself (e.g., payload). For example, in a 2:1 ratio, the RDP data compression algorithm may compress 2 MB data into 1 MB.

In one or more embodiments of the invention, to be able to provide the remote computer-implemented services to the front-end devices (100), the back-end devices (130) may host virtual machines (VMs) (not shown) to run the VDI environment. In one or more embodiments, the VMs may be logical entities executed using computing resources of the back-end devices (130) or using computing resources of other computing devices (e.g., servers, distributed computing systems, cloud resources, etc.) connected to the backend devices (130). Each of the VMs may be performing similar or different processes.

In one or more embodiments of the invention, the VMs (and applications hosted by the VMs) may generate data (e.g., VM data) that is stored in persistent storage (not shown). In one or more embodiments, the VM data may reflect the state of a VM.

In one or more embodiments of the invention, in addition to running the VDI environment, the VMs may provide services to the front-end devices (100). For example, the VMs may host instances of databases, email servers, or other applications that are accessible to the front-end devices (100). The VMs may host other types of applications not listed above without departing from the scope of the invention. Moreover, the applications hosted by the VMs may provide application services to the front-end devices (100).

In one or more embodiments of the invention, the VMs may be implemented as computer instructions, e.g., computer code, stored on the persistent storage that when executed by a processor of the back-end devices (130) cause the back-end devices (130) to provide the functionality of the VMs described throughout this application.

In one or more embodiments of the invention, a hypervisor (not shown) may be configured to orchestrate the operation of the VMs by allocating computing resources of the back-end devices (130) to each of the VMs.

In one or more embodiments of the invention, the hypervisor may be a physical device including circuitry. The physical device may be, but it is not limited to: a field-programmable gate array (FPGA), an application-specific integrated circuit, a programmable processor, a microcontroller, a digital signal processor, etc. The physical device may be adapted to provide the functionality of the hypervisor described throughout this application.

Alternatively, in one or more embodiments of the invention, the hypervisor may be implemented as computer instructions, e.g., computer code, stored on the persistent storage that when executed by a processor of the back-end devices (130) cause the back-end devices (130) to provide the functionality of the VMs described throughout this application.

In one or more embodiments of the invention, the back-end devices (130) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the back-end devices (130) described throughout this application.

Alternatively, in one or more embodiments of the invention, similar to the front-end devices (100), the back-end devices (130) may also be implemented as logical devices, as discussed above.

In one or more embodiments of the invention, the service manager (140) may manage the remote computer-implemented services provided by the back-end devices (130) by: (i) identifying the services the back-end devices (130) are to provide (e.g., based on the number of users using the front-end devices (100)); (ii) identifying the ports that the back-end devices (130) utilize to provide the remote computer-implemented services; and (iii) limiting network communications within the system (101) to only allow the back-end devices (130) to communicate using the ports corresponding to the identified services.

To limit the network communications within the system (101), the service manager (140) may configure the network-enabled subcomponents. For example, the service manager (140) may: (i) disable some of the ports of the network-enabled subcomponents; (ii) enable other ports of the network-enabled subcomponents (e.g., those ports corresponding to the remote computer-implemented services provided by the back-end devices (130)); and (iii) reduce the communications BW afforded to the back-end devices (130).

Therefore, while the back-end devices (130) may be capable of performing any number of remote computer-implemented services, they may be limited in providing any number of the remote computer-implemented services over the network (120). For example, the network-enabled subcomponents may prevent the back-end devices (130) from communicating with the front-end devices (100) using certain ports (which are required to provide the remote computer-implemented services that are being limited).

In one or more embodiments of the invention, by configuring the network-enabled subcomponents, the remote computer-implemented services provided to the users of the front-end devices (100) may be granularly configured without modifying the operation(s) of the front-end devices (100).

In one or more embodiments of the invention, the service manager (140) may allocate the computing resources (e.g., memory, CPU, storage, network BW, GPU, DPU, etc.) available in the VDI environment to generate a plurality of VD pools. In one or more embodiments, after the plurality of VD pools are generated, the service manager (140) may migrate (when necessary) one or more VDs to another VD pool. For example, when one of the VDs requires access to more of one type of computing resource (e.g., access to more DPUs), the service manager (140) may migrate that VD to a VD pool with a higher DPU availability. In another example, when one of the VDs requires less access to DPUs, the service manager (140) may migrate that VD to a VD pool with a lower DPU availability. Additional details regarding VD migration are described below in reference to FIG. 4.2.

In one or more embodiments of the invention, the service manager (140) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the service manager (140) described throughout this application.

Alternatively, in one or more embodiments of the invention, similar to the front-end devices (100), the service manager (140) may also be implemented as a logical device, as discussed above.

Figure 2:
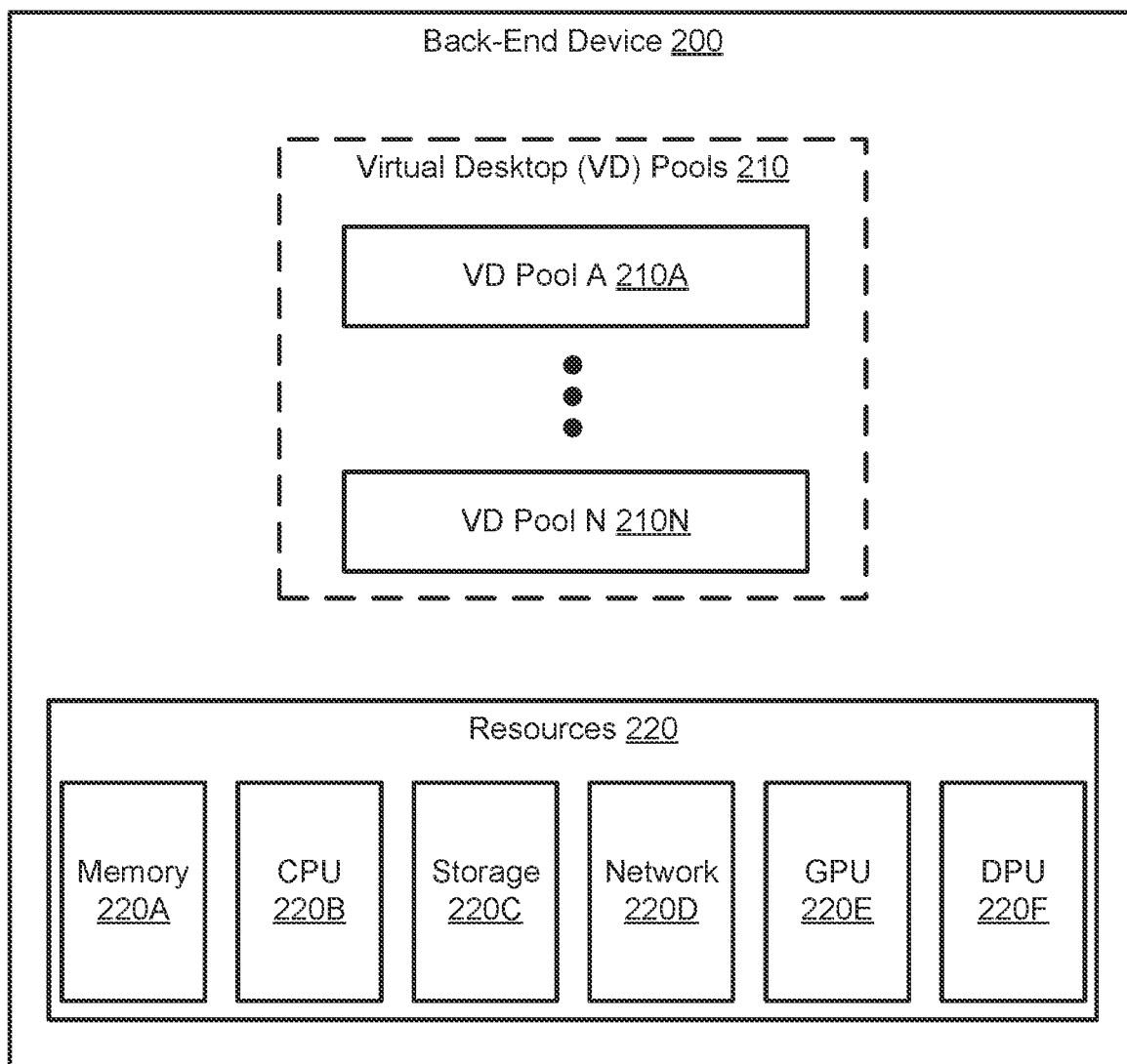
FIG. 2 shows a diagram of a back-end device in accordance with one or more embodiments of the invention.

Turning now to FIG. 2, FIG. 2 shows a diagram of a back-end device in accordance with one or more embodiments of the invention. The back-end device (200) may be any one of the back-end devices (130) discussed above in reference to FIG. 1. The back-end device (200) may include a plurality of VD pools (210) and resources (220) (also referred to above as the "computing resources"). The back-end device (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments of the invention, each VD pool (VD pool A (210A), VD pool N (210N)) may include a plurality of VDs (e.g., VD A, VD B, VD C, etc.) (not shown in FIG. 2 for the sake of brevity). In one or more embodiments, a VD pool configuration for each of the plurality of VD pools may be generated using a common configuration template set (not shown) and a plurality of resource specific pool specific configuration templates (not shown). Additional details regarding the common configuration template set, the plurality of resource specific pool specific configuration templates, and the generation of each VD pool configuration are described below in reference to FIGS. 3 and 4.1, respectively.

In one or more embodiments of the invention, the resources (220) may include, but they are not limited to: memory (220A), a CPU (220B), storage (220C), network (220D), a GPU (220E), a DPU (220F), etc. Each of these resources is described below.

In one or more embodiments of the invention, the memory (220A) may be any hardware component that is used to store data in a computing device (e.g., 600, FIG. 6). The data stored in the memory (220A) may be accessed almost instantly (e.g., in milliseconds) regardless of where the data is stored in the memory (220A). In one or more embodiments, the memory (220A) may provide the above-mentioned instant data access because the memory (220A) may be directly connected to the CPU (220B) on a wide and fast bus (e.g., a high-speed internal connection that transfers data between the hardware components of a computing device).

In one or more embodiments of the invention, the memory (220A) may be (or may include), but it is not limited to: DRAM (e.g., double data rate 4 (DDR4) DRAM, error correcting code (ECC) DRAM, etc.), PMEM, Flash memory, etc. In these memory types, the DRAM may be volatile in which it may only store data as long as it is being supplied with power. Additionally, the PMEM and Flash memory may be non-volatile in which they may store data even after a power supply is removed.

In one or more embodiments of the invention, the CPU (220B) may refer to an electronic circuitry that may execute operations specified by an application. More specifically, the CPU (220B) may perform an operation in three steps: (i) fetching instructions related to the operation from the memory (220A); (ii) analyzing the fetched instructions; (iii) performing the operation based on the analysis. In one or more embodiments, the operation may include, but it is not limited to: basic arithmetic calculations, comparing numbers, performing a function, displaying a video, etc.

In one or more embodiments of the invention, the CPU (220B) may include, but it is not limited to: 10-core (e.g., an individual processor within the CPU) (with 3.7 GHZ clock speed), two channels DDR4 DRAM support, etc. In one or more embodiments, the clock speed may refer to the number of instructions that the CPU (220B) is able to handle per second.

In one or more embodiments of the invention, as a central processing virtualization platform, a virtual CPU (vCPU) application may be provided to the plurality of VDs. In one or more embodiments, the vCPU application may enable the plurality of VDs to have direct access to a single physical CPU. More specifically, the vCPU application may provide computing capabilities by sharing the single physical CPU among the plurality of VDs.

In one or more embodiments of the invention, the storage (220C) may refer to a hardware component that is used to store data in a computing device (e.g., 600, FIG. 6). In one or more embodiments, the storage (220C) may be a physical computer readable medium. For example, the storage (220C) may be (or may include) hard disk drives (e.g., HDDs), Flash-based storage devices (e.g., SSDs), tape drives, fibre-channel (FC) based storage devices, or other physical storage media. The storage may be other types of digital storage not listed above without departing from the scope of the invention.

In one or more embodiments of the invention, the storage (220C) may be configured as a storage array (e.g., a network attached storage array). In one or more embodiments, the storage array may refer to a collection of one or more physical storage devices, in which various forms of data may be consolidated. Each physical storage device may include non-transitory computer readable storage media, in which the data may be stored in whole or in part, and temporarily or permanently.

In one or more embodiments of the invention, the SSDs may use a non-volatile memory express (NVMe) or NVME over Fabrics (NVMe-oF) interface protocols for accessing Flash storage via a peripheral component interconnect express (PCI-e) bus. In one or more embodiments, in comparison to a SATA bus (e.g., 600 MB/s data transfer rate), the PCI-e bus may provide much higher data transfer rate (e.g., 64,000 MB/s). In this manner, the NVMe may execute, for example, 65535 command queues simultaneously (with a depth of 65536 commands per queue), whereas a SATA-based SSD may execute only one command queue (with a depth of 32 commands per queue).

In one or more embodiments of the invention, the NVMe-OF interface protocol may extend capabilities of the NVMe interface protocol over a remote direct memory access (RDMA) or Fibre Channel fabric (e.g., a high-speed networking technology to transfer data among data centers, computer servers, etc.). In this manner, the capabilities of the NVMe interface protocol may be provided over distances.

In one or more embodiments of the invention, the network (220D) may refer to a computer network including two or more computers that are connected any combination of wired and/or wireless connections. In one or more embodiments, the computer network may be generated using hardware components (e.g., routers, access points, cables, switches, etc.) and software components (e.g., OSs, business applications, etc.).

In one or more embodiments of the invention, geographic location may define the computer network. For example, a LAN may connect computing devices in a defined physical space (e.g., office building), whereas a WAN (e.g., Internet) may connect computing devices across continents. In one or more embodiments, the computer network may be defined based on network protocols (e.g., TCP, UDP, IPv4, etc.). Details regarding the network protocols are described above in reference to FIG. 1.

In one or more embodiments of the invention, the quality of communication over a computer network may be determined by measuring the computer network's quality of service (QOS). In one or more embodiments, the QoS may include one or more hardware and/or software components to guarantee the computer network's ability to run highpriority applications under limited network capacity. The hardware and/or software components operating on the computer network may accomplish this by providing differentiated handling (e.g., a networking architecture to classify and manage QoS on computer networks) and capacity allocation. In one or more embodiments, parameters that can be used to measure the QoS may include, but they are not limited to: BW, delay, jitter, error rate, etc.

In one or more embodiments of the invention, the GPU (220E) may refer to an electronic circuitry that may provide parallel data processing capabilities to generate enhanced, real-time graphics and to perform accelerated computing tasks (which is particularly useful for machine learning (ML) operations).

In one or more embodiments of the invention, the GPU (220E) may include, but it is not limited to: graphics memory controller, video processing engine, graphics and computation engine, etc.

In one or more embodiments of the invention, as a graphics virtualization platform, virtual GPU (vGPU) application may be provided to the plurality of VDs. In one or more embodiments, the vGPU application may enable the plurality of VDs to have direct access to a single physical GPU. More specifically, the vGPU application may provide the parallel data processing and accelerated computing capabilities by sharing the single physical GPU among the plurality of VDs.

In one or more embodiments of the invention, breadth-first and depth-first GPU allocation policies may be utilized for vGPU-enabled VDs. In one or more embodiments, each hypervisor (discussed above in reference to FIG. 1) may use the breadth-first or the depth-first GPU allocation policy by default. Each of these GPU allocation policies is described below.

In one or more embodiments of the invention, the breadth-first GPU allocation policy may reduce the number of vGPUs running on a plurality of physical GPUs. For example, newly generated vGPUs may be placed on a physical GPU that has the fewest vGPUs already resident on it. In one or more embodiments, the breadth-first GPU allocation policy may provide higher performance because it reduces sharing of the plurality of physical GPUs.

In one or more embodiments of the invention, the depth-first GPU allocation policy may increase the number of vGPUs running on the plurality of physical GPUs. For example, the newly generated vGPUs may be placed on a physical GPU that has the most vGPUs already resident on it. In one or more embodiments, the depth-first GPU allocation policy may provide higher density of vGPUs, particularly when different types of vGPUs are being run. However, the depth-first GPU allocation policy may also provide lower performance because it may maximize sharing of the plurality of physical GPUs.

In one or more embodiments of the invention, the DPU (220F) may refer to an electronic circuitry that may perform accelerated data processing and optimized data movement data within a data center. In one or more embodiments, the DPU may include, but it is not limited to: high-speed networking interface (e.g., 200 gigabits per second (200 Gbps)), DRAM, multi-core (e.g., 8-core) CPU, programmable acceleration engines (particularly for ML, security, and telecommunications purposes), etc.

In one or more embodiments of the invention, as a data processing virtualization platform, a virtual DPU (vDPU) application may be provided to the plurality of VDs. In one or more embodiments, the vDPU application may enable the plurality of VDs to have direct access to a single physical DPU. More specifically, the vDPU application may provide full data center-on-chip programmability, high performance networking and computing capabilities by sharing the single physical DPU among the plurality of VDs.

Figure 3:
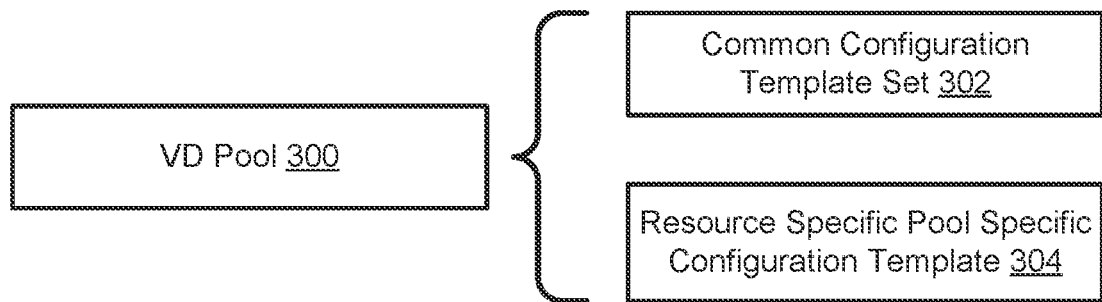
FIG. 3 shows a relationship diagram illustrating the computing resources utilized by a virtual desktop (VD) pool in accordance with one or more embodiments of the invention.

Turning now to FIG. 3, FIG. 3 shows a relationship diagram illustrating how computing resources are utilized by a VD pool in accordance with one or more embodiments of the invention. In one or more embodiments of the invention, as discussed above in reference to FIG. 2, a VD pool configuration of a VD pool (300) may be generated using: a common configuration template set (302) (e.g., a level one (L1) template); and a resource specific pool specific configuration template (304) (e.g., a level two (L2) template).

In one or more embodiments of the invention, the L1 template may correspond to one or more common templates that are used to configure a set of computing resources across the plurality of VD pools. In one or more embodiments, the VDs residing in different VD pools (e.g., 210A, 210N, FIG. 2) may have common-attributes (e.g., the same VD image, CPU assignment, and GPU assignment, etc.). However, in certain circumstances based on users' requirements and/or technical considerations of a data center, there may be a requirement for some of the configuration parameters to be fixed and some of the configuration parameters to be variable (e.g., tiered). As a result, some of the configuration parameters may need to be redefined by combining L1 and L2 templates.

In one or more embodiments of the invention, the L2 template may correspond to a template that includes a specific configuration for a target resource (e.g., DPU). This specific configuration may only be used for a particular (e.g., specific) VD pool. For example, consider a scenario in which there are six types of resources (discussed above in reference to FIG. 2) and the administrators wish to optimize a DPU configuration of three particular VD pools (e.g., VD pool B, VD pool C, and VD pool D) because these three VD pools may be DPU specific VD pools. In this scenario, there may be only a single L1 template that includes configurations for each of the resource types (e.g., a single L1 template that includes configuration parameters for memory, CPU, storage, network, GPU, and DPU). Said another way, only a single L1 template may be retrieved and used for all of the VD pools. Alternatively, there may be six separate L1 templates that each includes only a single configuration directed to one of the resource types (e.g., one L1 template for memory, one L1 template for CPU, one L1 template for storage, one L1 template for network, one L1 template for GPU, and one L1 template for DPU).

In one or more embodiments, in order to optimize the DPU configuration of each of the three DPU specific VD pools, the administrators may need to generate three L2 templates for the DPU resource (e.g., a 1 GB/s (1 Gigabyte per second) BW (bandwidth) vDPU with 1 GB vDPU frame buffer L2 template, a 2 GB/s BW vDPU with 1 GB vDPU frame buffer L2 template, and a 4 GB/s BW vDPU with 1 GB vDPU frame buffer L2 template). For each of the three DPU specific VD pools, the administrators may then need to combine the L1 template(s) with each of the respective L2 templates to fully define the configuration of each of the three DPU specific VD pools.

In the above-discussed scenario, while the remaining VDs in the VDI environment continue sharing the common-attributes, each of the three DPU specific VD pools may have the following configurations: (i) VD pool B: the L1 template and the 1 GB/s BW vDPU with 1 GB vDPU frame buffer L2 template; (ii) VD pool C: the L1 template and the 2 GB/s BW vDPU with 1 GB vDPU frame buffer L2 template; and (iii) VD pool D: the L1 template and the 4 GB/s BW vDPU with 1 GB vDPU frame buffer L2 template.

FIGS. 4.1 and 4.2 show a method for managing a common-attribute VDI environment with tiered DPU capabilities in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.1, the method shown in FIG. 4.1 may be performed by, for example, the service manager (e.g., 140, FIG. 1). Other components of the system (e.g., 101, FIG. 1) illustrated in FIG. 1 may also contribute to the performance of the method shown in FIG. 4.1 without departing from the scope of the invention.

In Step 400, a target resource is selected. For example, in one or more embodiments of the invention, the selected target resource may be DPU.

In Step 402, a number of VD pools to be created is determined. Continuing with the scenario discussed above in reference to FIG. 3, the administrators may determine how many VD pools (e.g., three) need to be created. Alternatively, the number of VD pools that needs to be created may be predetermined based on technical considerations of a data center.

In Step 404, a target resource specific pool specific configuration template for each of the VD pools is obtained. In one or more embodiments of the invention, the target L2 template for each of the VD pools may be obtained from, for example: the front-end devices (e.g., 100, FIG. 1), persistent storage, target L2 template vendor(s), etc.

In one or more embodiments of the invention, prior to obtaining the target L2 template, the target L2 template for each of the VD pools may be generated. More specifically, one or more target L2 templates (e.g., a 1 GB/s BW vDPU with 1 GB vDPU frame buffer template, a 2 GB/s BW vDPU with 1 GB vDPU frame buffer template, a 4 GB/s BW vDPU with 1 GB vDPU frame buffer template, etc.) may be generated by administrators based on users' preferences. The users' preferences may include, but they are not limited to: the names of applications that need to be run, the type of the VD image, the version of the VD image, etc.

Alternatively, in one or more embodiments of the invention, the target L2 templates may be generated without considering the users' preferences. For example, even though a user has requested the generation of a 1 GB/s BW vDPU with 1 GB vDPU frame buffer L2 template, a 2 GB/s BW vDPU with 1 GB vDPU frame buffer L2 template, and a 4 GB/s BW vDPU with 1 GB vDPU frame buffer L2 template, the user may not be provided with these requested L2 templates because 1 GB vDPU frame buffer may not be an available resource. For example, the user may be provided with previously generated target L2 templates such as a 1 GB/s BW vDPU with 512 MB vDPU frame buffer L2 template, a 2 GB/s BW vDPU with 512 MB vDPU frame buffer L2 template, and a 4 GB/s BW vDPU with 512 MB vDPU frame buffer L2 template that are generated based on currently available target resources (e.g., 512 MB vDPU frame buffer) among the resources (e.g., 220, FIG. 2).

In Step 406, a common configuration template set (e.g., the L1 template) is obtained. Details regarding the L1 template are described above in reference to FIG. 3.

In Step 408, a target L2 template from the plurality of target L2 templates is selected. Continuing with the scenario discussed above in reference to FIG. 3, the 2 GB/s BW vDPU with 1 GB vDPU frame buffer L2 template may be selected from among the 1 GB/s BW vDPU with 1 GB vDPU frame buffer L2 template, the 2 GB/s BW vDPU with 1 GB vDPU frame buffer L2 template, and the 4 GB/s BW vDPU with 1 GB vDPU frame buffer L2 template.

In Step 410, a VD pool configuration for each of the plurality of VD pools is generated using the plurality of target L2 templates and the L1 template. In one or more embodiments of the invention, a VD pool configuration of a specific VD pool may be generated using the selected target L2 template for that specific VD pool and the L1 template (that is common for all the VD pools). For example, a VD pool configuration may be generated for VD pool C using the L1 template and the 2 GB/s BW vDPU with 1 GB vDPU frame buffer L2 template (e.g., the selected target L2 template for VD pool C as discussed above via the example presented in FIG. 3).

In Step 412, a first determination is performed to determine whether additional VD pool configurations are required. If the result of the first determination is YES, the method returns to Step 408. If the result of the first determination is NO, the method proceeds to Step 414. For example, referring to the example scenario discussed above in reference to FIG. 3, if the result of the first determination in Step 412 shows that only one VD pool configuration is generated (for VD pool B) while VD pool configurations have not yet been generated for VD pools C and D, the method may return to Step 408 to generate the remaining two VD pool configurations (for VD pool C and VD pool D).

In Step 414, a default VD pool is selected from the plurality of VD pools. Continuing with the scenario discussed above in reference to FIG. 3, VD pool C may be selected as the default pool. In one or more embodiments of the invention, the default VD pool may be selected based on users' preferences or may be selected automatically (based on previous users' target resource utilization information). For example, based on the users' preferences for selecting VD pools with more resource availability, VD pool D may be selected because VD pool D has a higher target resource availability. As another example, based on the previous users' target resource usage data, VD pool C may be selected because VD pool C has an average target resource availability.

In one or more embodiments, the previous users' target resource usage data may be based on data collected about VD pools that are assigned to users previously (by the administrators). For example, during the last four default VD pool assignment processes, VD pool D was assigned to one user and VD pool C was assigned to three other users. For this reason, the previous users' target usage data indicates that the next user should be assigned to VD pool C.

In Step 416, a plurality of VDs are deployed into the default VD pool using a VD pool configuration associated with the default VD pool. Continuing with the example discussed above in FIG. 3, the plurality of VDs may be deployed into VD pool C because of the VD pool configuration of VD pool C (e.g., the configurations included in the L1 template and the 2 GB/s BW vDPU with 1 GB vDPU frame buffer L2 template of VD pool C). Additional details regarding the deployment of VDs into a default VD pool are described below in reference to FIGS. 5.1-5.3.

In one or more embodiments of the invention, the method may end following Step 416.

Turning now to FIG. 4.2, the method shown in FIG. 4.2 may be performed by, for example, the service manager (e.g., 140, FIG. 1). Other components of the system (e.g., 101, FIG. 1) illustrated in FIG. 1 may also contribute to the performance of the method shown in FIG. 4.2 without departing from the scope of the invention.

In Step 418, each of the VDs is monitored to obtain target resource utilization information. In one or more embodiments of the invention, in the event that the target resource is DPU, the target resource utilization information may be DPU utilization information of each of the VDs. Continuing with the scenario discussed above in reference to FIG. 3 and assuming that the target resource is DPU, the target resource utilization information may indicate, for example, "VD A's current DPU utilization is 10%", "VD B's current DPU utilization is 90%", and "VD E's current DPU utilization is 8%".

In Step 420, target resource telemetry is obtained. In one or more embodiments of the invention, the target resource telemetry may refer to additional DPU utilization information that is obtained from other components of the system (e.g., 101, FIG. 1) illustrated in FIG. 1. For example, the service manager may obtain the additional DPU utilization information from the persistent storage and/or one or more hyperconverged nodes (not shown). In one or more embodiments, a hyperconverged node may refer to a unified data center that combines storage, computation, networking, and management functionalities of a data center in a single hardware component.

More specifically, in one or more embodiments of the invention, the service manager may obtain the additional DPU utilization information through an application programming interface (API) call. In one or more embodiments, the API may represent a collection of methods and procedures (e.g., retrieving information about an API source, updating the API source, etc.) that may be executed by other applications in a computing system (e.g., 600, FIG. 6). The collection of methods and procedures may be designed and configured to facilitate the service manager's access for DPU utilization check and manipulation of locally stored DPU utilization information. For example, the service manager may make an API call to each of the other components of the system (e.g., 101, FIG. 1) illustrated in FIG. 1. In return, that API call may obtain the target resource telemetry. Other resource monitoring methods may also be taken into account without departing from the scope of the invention.

In Step 422, a second determination is performed based on the target resource utilization information (including the information obtained in Step 418 and Step 420) to determine whether at least one migration criterion of the default VD pool is satisfied. If the result of the second determination is YES, the method proceeds to Step 424. If the result of the second determination is NO, the method returns to Step 418.

In one or more embodiments of the invention, the second determination may be performed by comparing the target resource utilization information of each of the VDs with the migration criterion of the default VD pool. Additional details regarding the migration criterion of the default VD pool are described below in reference to Step 426 and Step 428.

In one or more embodiments of the invention, the migration criterion may include a network BW threshold value. In one or more embodiments, the network BW may refer to the maximum allowed amount of data transmitted over the network in a given amount of time (e.g., the BW of the network). For example, a 1 GB/s BW vDPU with 1 GB vDPU frame buffer VD pool may have a 1 GB/s BW and a 2 GB/s BW vDPU with 1 GB vDPU frame buffer VD pool may have a 2 GB/s BW. As another example, if one of the VDs deployed into the default VD pool (e.g., a 2 GB/s BW vDPU with 1 GB vDPU frame buffer VD pool) needs a higher amount of network BW because of higher DPU utilization, this VD may need to be migrated to a VD pool (e.g., a 4 GB/s BW vDPU with 1 GB vDPU frame buffer VD pool) that has a much higher amount of network BW.

In one or more embodiments of the invention, the service manager may store the migration criterion locally in persistent storage or may obtain the one migration criterion from the administrators.

In Step 424, a third determination is performed to determine whether additional DPU is required. If the result of the third determination is YES, the method proceeds to Step 426. If the result of the third determination is NO, the method proceeds to Step 428.

In Step 426, one or more VDs that require more DPU access are migrated to a VD pool with a higher (e.g., larger) DPU availability. Continuing with the example discussed in Step 418, VD B may need to be migrated from a 2 GB/s BW vDPU with 1 GB vDPU frame buffer VD pool to a 4 GB/s BW vDPU with 1 GB vDPU frame buffer VD pool because the current DPU utilization of VD B (e.g., 90%) is above one of the migration criteria (e.g., migration required if the current DPU utilization is above 60%) of the 2 GB/s BW vDPU with 1 GB vDPU frame buffer VD pool. Additional details regarding this example migration are described in reference to FIGS. 5.1-5.3.

In one or more embodiments of the invention, the method may end following Step 426.

In Step 428, one or more VDs that require less DPU access are migrated to a VD pool with a lower (e.g., smaller) DPU availability. Continuing with the example discussed in Step 418, VD A may need to be migrated from a 2 GB/s BW vDPU with 1 GB vDPU frame buffer VD pool to a 1 GB/s BW vDPU with 1 GB vDPU frame buffer VD pool because the current DPU utilization of VD A (e.g., 10%) is below one of the migration criteria (e.g., migration required if the current DPU utilization is below 15%) of the 2 GB/s BW vDPU with 1 GB vDPU frame buffer VD pool. Additional details regarding this example migration are described in reference to FIGS. 5.1-5.3.

In one or more embodiments of the invention, the method may end following Step 428.

Start of Example

The following section describes an example of one or more embodiments. The example, illustrated in FIGS. 5.1-5.3, is not intended to limit the scope of the embodiments disclosed herein and is independent from any other examples discussed in this application.

Turning to the example, consider a scenario in which five VDs (e.g., VD A (502A), VD B (502B), VD C (502C), VD D (502D), and VD E (502E)) are deployed into VD pool C (504) (e.g., a default VD pool). Initially, FIG. 5.1 shows a diagram of an example of a back-end device (500). For the sake of brevity, not all components of the example back-end device may be illustrated in FIG. 5.1.

Based on the VD pool configuration of VD pool C, the five VDs are deployed into VD pool C (504). More specifically, assume here that the VD pool configuration of VD pool C (504) includes: (i) 8 GB DRAM; (ii) 2 vCPUs with 4 cores; (iii) 80 GB SSD storage; (iv) 10 GB/s BW with 5 ms latency QoS; (v) depth-first vGPU with 2 GB vGPU frame buffer; and (vi) 2 GB/s BW vDPU with 1 GB vDPU frame buffer.

At this time, all five VDs are directed (e.g., instructed) to use the above-mentioned resources of VD pool C (504) to provide services to the users and/or administrators.

Turning now to FIG. 5.2, FIG. 5.2 shows a diagram of the example back-end device (500) at a later point in time. The service manager (not shown) starts monitoring each VD in VD pool C (504). After obtaining each VD's DPU utilization information, the service manager makes a first determination that at least one migration criterion of VD pool C (504) is satisfied. More specifically, the service manager has determined that VD A (502A)'s current DPU utilization of 10% is below VD pool C's (504) lower DPU utilization threshold of 15%. Following this first determination, the service manager makes a second determination that another migration criterion of VD pool C (504) is satisfied. More specifically, VD B (502B)'s current DPU utilization of 90% has exceeded VD pool C's (504) upper DPU utilization threshold of 60%. Following this second determination, the service manager makes a third determination that another migration criterion of VD pool C (504) is satisfied. More specifically, VD E (502E)'s current DPU utilization of 4% has stayed under VD pool C's (504) lower DPU utilization threshold of 15%.

Based on the above three determinations made by the service manager, the service manager decides to migrate VD A (502A) and VD E (502E) to VD pool B (502). This is because the VD pool configuration of VD pool B (502) includes: (i) 8 GB DRAM; (ii) 2 vCPUs with 4 cores; (iii) 80 GB SSD storage; (iv) 10 GB/s BW with 5 ms latency QoS; (v) depth-first vGPU with 2 GB vGPU frame buffer; and (vi) 1 GB/s BW vDPU with 1 GB vDPU frame buffer. The service manager also decides to migrate VD B (502B) to VD pool D (506) because the VD pool configuration of VD pool D (506) includes: (i) 8 GB DRAM; (ii) 2 vCPUs with 4 cores; (iii) 80 GB SSD storage; (iv) 10 GB/s BW with 5 ms latency QoS; (v) depth-first vGPU with 2 GB vGPU frame buffer; and (vi) 4 GB/s BW vDPU with 1 GB vDPU frame buffer.

At this time, all five VDs are still directed to use the same resources to provide services to the users and/or administrators.

Turning now to FIG. 5.3, FIG. 5.3 shows a diagram of the example back-end device (500) at yet a later point in time. Following the decisions made by the service manager, VD A (502A) and VD E (502E) are migrated to VD pool B (502), and VD B (502B) is migrated to VD pool D (506). At this time, in response to the VD pool migrations, VD A (502A) and VD E (502E) are now directed to use the resources of VD pool B (502), and VD B (502B) is now directed to use the resources of VD pool D (506). VD C (502C) and VD D (502D) are still directed to use the same resources of VD pool C (504).

End of Example

Turning now to FIG. 6, FIG. 6 shows a diagram of a computing device in accordance with one or more embodiments of the invention.

In one or more embodiments of the invention, the computing device (600) may include one or more computer processors (602), non-persistent storage (604) (e.g., volatile memory, such as RAM, cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a LAN, a WAN, such as the Internet, mobile network, or any other type of network) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a virtual desktop infrastructure (VDI) environment, the method comprising:
obtaining a plurality of target resource specific pool specific configuration templates for a target resource using an integrated circuitry of a service manager,
wherein each of the plurality of target resource specific pool specific configuration templates is associated with one of a plurality of virtual desktop (VD) pools,
wherein the target resource is a data processing unit (DPU),
wherein the plurality of target resource specific pool specific configuration templates is generated based on a user's preference specifying a type of a VD image, a version of the VD image, and a type of a VD pool of the plurality of VD pools that needs to be selected,
wherein the VD image is a preconfigured image of an operating system and accessibility of the user to the VD image depends on a configuration defined by an administrator, wherein the service manager stores at least one migration criterion of a default VD pool issued by the administrator;
obtaining a common configuration template set;
generating a VD pool configuration for each of the plurality of VD pools using the plurality of target resource specific pool specific configuration templates and the common configuration template set to obtain a plurality of VD pool configurations;

selecting, based on the user's preference, the default VD pool from the plurality of VD pools being executed in a back-end device,
   wherein the service manager and the back-end device are operatively connected to each other over a combination of wired and wireless connections; and deploying, based on the selection, a plurality of VDs into the default VD pool using a VD pool configuration associated with the default VD pool.

2. The method of claim 1, further comprising:

monitoring each of the plurality of VDs to obtain target resource utilization information;

making a determination, based on the target resource utilization information, that at least the one migration criterion of the default VD pool is satisfied;

making a second determination, based on the determination, that an additional target resource availability is required; and migrating, based on the second determination, one or more VDs that require the additional target resource availability to a VD pool of the plurality of VD pools with higher target resource availability, wherein the VD pool is associated with a VD pool configuration of the plurality of VD pool configurations and wherein the VD pool configuration is associated with a target resource specific pool specific configuration template that is different than a target resource specific pool specific configuration template associated with the default VD pool.

3. The method of claim 2, wherein making the determination that at least the one migration criterion of the default VD pool is satisfied comprises:

comparing the target resource utilization information of each of the plurality of VDs with at least the one migration criterion of the default VD pool.

4. The method of claim 2, wherein at least the one migration criterion comprises a network bandwidth (BW) threshold value.

5. The method of claim 1, wherein each of the plurality of target resource specific pool specific configuration templates comprises target resource related VD pool configuration parameters.

6. The method of claim 1, wherein the DPU is a two gigabytes per second bandwidth virtual DPU (vDPU) with a one gigabyte vDPU frame buffer.

7. The method of claim 1, wherein the common configuration template set comprises non-target resource related VD pool configuration parameters.

8. A method for managing a virtual desktop infrastructure (VDI) environment, the method comprising:

obtaining a plurality of target resource specific pool specific configuration templates for the target resource using an integrated circuitry of a service manager,
   wherein each of the plurality of target resource specific pool specific configuration templates is associated with one of the plurality of VD pools, wherein the target resource is a data processing unit (DPU),
   wherein the plurality of target resource specific pool specific configuration templates is generated based on a user's preference specifying a type of a VD image, a version of the VD image, and a type of a VD pool of the plurality of VD pools that needs to be selected,
   wherein the VD image is a preconfigured image of an operating system and accessibility of the user to the VD image depends on a configuration defined by an administrator, wherein the service manager stores at least one migration criterion of a default VD pool issued by the administrator;

obtaining a common configuration template set;

generating a VD pool configuration for each of the plurality of VD pools using the plurality of target resource specific pool specific configuration templates and the common configuration template set to obtain a plurality of VD pool configurations;

selecting, based on the user's preference, the default VD pool from the plurality of VD pools being executed in a back-end device,
   wherein the service manager and the back-end device are operatively connected to each other over a combination of wired and wireless connections;

deploying, based on the selection, a plurality of VDs into the default VD pool using a VD pool configuration associated with the default VD pool;

monitoring each of the plurality of VDs to obtain target resource utilization information, wherein the target resource utilization information is associated with the target resource;

making a determination, based on the target resource utilization information, that at least the one migration criterion of the default VD pool is satisfied;

making a second determination, based on the determination, that an additional target resource availability is required; and migrating, based on the second determination, one or more VDs that require the additional target resource availability to a VD pool of the plurality of VD pools with higher target resource availability, wherein the VD pool is associated with a VD pool configuration of the plurality of VD pool configurations and wherein the VD pool configuration is associated with a target resource specific pool specific configuration template that is different than a target resource specific pool specific configuration template associated with the default VD pool.

9. The method of claim 8, wherein making the determination that at least the one migration criterion of the default VD pool is satisfied comprises:

comparing the target resource utilization information of each of the plurality of VDs with at least the one migration criterion of the default VD pool.

10. The method of claim 8, wherein at least the one migration criterion comprises a network bandwidth (BW) threshold value.

11. The method of claim 8, wherein each of the plurality of target resource specific pool specific configuration templates comprises target resource related VD pool configuration parameters.

12. The method of claim 8, wherein the DPU is a one gigabyte per second bandwidth virtual DPU (vDPU) with a one gigabyte vDPU frame buffer.

13. The method of claim 8, wherein the common configuration template set comprises non-target resource related VD pool configuration parameters.

14. A non-transitory computer readable medium comprising computer readable program code, which when executed by a computer processor enables the computer processor to perform a method for managing a virtual desktop infrastructure (VDI) environment, the method comprising:

obtaining a plurality of target resource specific pool specific configuration templates for a target resource using an integrated circuitry of a service manager, wherein each of the plurality of target resource specific pool specific configuration templates is associated with one of a plurality of virtual desktop (VD) pools, wherein the target resource is a data processing unit (DPU), wherein the plurality of target resource specific pool specific configuration templates is generated based on a user's preference specifying a type of a VD image, a version of the VD image, and a type of a VD pool of the plurality of VD pools that needs to be selected, wherein the VD image is a preconfigured image of an operating system and accessibility of the user to the VD image depends on a configuration defined by an administrator, wherein the service manager stores at least one migration criterion of a default VD pool issued by the administrator;

obtaining a common configuration template set;

generating a VD pool configuration for each of the plurality of VD pools using the plurality of target resource specific pool specific configuration templates and the common configuration template set to obtain a plurality of VD pool configurations;

selecting, based on the user's preference, the default VD pool from the plurality of VD pools being executed in a back-end device, wherein the service manager and the back-end device are operatively connected to each other over a combination of wired and wireless connections; and deploying, based on the selection, a plurality of VDs into the default VD pool using a VD pool configuration associated with the default VD pool.

15. The non-transitory computer readable medium of claim 14, further comprising:

monitoring each of the plurality of VDs to obtain target resource utilization information;

making a determination, based on the target resource utilization information, that at least the one migration criterion of the default VD pool is satisfied;

making a second determination, based on the determination, that an additional target resource availability is required; and migrating, based on the second determination, one or more VDs that require the additional target resource availability to a VD pool of the plurality of VD pools with higher target resource availability, wherein the VD pool is associated with a VD pool configuration of the plurality of VD pool configurations and wherein the VD pool configuration is associated with a target resource specific pool specific configuration template that is different than a target resource specific pool specific configuration template associated with the default VD pool.

16. The non-transitory computer readable medium of claim 15, wherein making the determination that at least the one migration criterion of the default VD pool is satisfied comprises:

comparing the target resource utilization information of each of the plurality of VDs with at least the one migration criterion of the default VD pool.

17. The non-transitory computer readable medium of claim 15, wherein at least the one migration criterion comprises a network bandwidth (BW) threshold value.

18. The non-transitory computer readable medium of claim 14, wherein each of the plurality of target resource specific pool specific configuration templates comprises target resource related VD pool configuration parameters.

19. The non-transitory computer readable medium of claim 14, wherein the common configuration template set comprises non-target resource related VD pool configuration parameters.

* * * * *